United States Patent Office 3,781,427
Patented Dec. 25, 1973

3,781,427
PHOSPHORIC ACID ESTERS AND THEIR USE AS INSECTICIDES
Ernst Beriger, Neuallschwil, Switzerland, assignor to Ciba-Geigy AG, Basel, Switzerland
No Drawing. Original application Apr. 27, 1970, Ser. No. 32,414, now Patent No. 3,725,513. Divided and this application Jan. 17, 1973, Ser. No. 324,468
Int. Cl. A01n 9/36
U.S. Cl. 424—217    4 Claims

ABSTRACT OF THE DISCLOSURE

Dithiophosphates of the formula

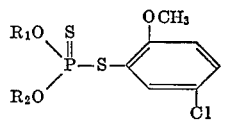

wherein $R_1$ and $R_2$ represent alkyl radicals of up to 4 carbon atoms are effective pesticidal agents, preferably for combating insects, nematodes and members of the order Acarina. The dithiophosphates may be used in pesticidal preparations.

---

This is a divisional of application Ser. No. 32,414, filed on Apr. 27, 1970, now U.S. Pat. No. 3,725,513.

This invention relates to phosphoric acid esters, processes for their preparation and pesticidal preparations containing them.

The present invention provides new phosphoric acid esters of the formula

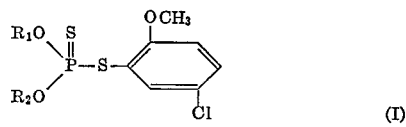
(I)

in which $R_1$ and $R_2$, which may be the same or different, each represents a straight chain or branched alkyl radical having from 1 to 4 carbon atoms.

The alkyl radicals represented by $R_1$ and $R_2$ in Formula I include the methyl, ethyl, n-propyl, isopropyl, n-butyl, isobutyl and the tert. butyl radicals.

The new phosphoric acid esters of Formula I represent highly active substances for combating insects in the broadest sense and pests of the order Acarina, including all their stages of development such as eggs, larvae and chrysales or pupae.

The compounds of Formula I can, for example, be used against all harmful insects, for example against aphids such as the green peach aphid (*Myzus persicae*), the bean aphid (*Doralis fabae*); shield lice such as *Aspidiotus hederae, Lecanium hesperidium, Pseudococcus maritimus*; thysanoptera such as *Hercinothrips femoralis,* and bugs such as the beet bug A*Piesma quadrata*) or the bed bug (*Cimex lectularius*), butterfly caterpillars, such as *Plutella maculipennis* and *Lymantira dispar*; beetles such as the granary weevil (*Calandra granaria*) or Colorado beetle (*Leptinotarsa decemlineata*); but also soil-inhabiting varieties, such as wire worms (Agriotes sp.) or cockchafer grubs (*Melolontha melolontha*); orthoptera, such as the German cockroach (*Blattella germanica*) and the cricket (*Gryllus domesticus*); termites, such as Reticulitermes; hymenoptera such as ants; diptera, such as the vinegar fly (*Drosophila melanogaster*), the Mediterranean fruit fly (*Ceratitis capitata*) and the housefly (*Musca domestica*), and also gnats (for example *Aedes aegytpi* and *Anopheles stephensi*).

The compounds of the Formula I are also especially effecitve for combatting representatives of the order Acarina such as, for example, Eulaelaps, Echinolaelaps, Laelaps, Haemogamasus, Dermanyssus, Ornithonyssus, and Allodermanyssus, especially *Allodermanyssus sanguineus,* Pneumonyssus, Amblyomma, Aponomma, Boophilus, Dermancentor, Haemophysalis, Hyalomma, Ixodidae, Maragaropus, Rhipicephalus. Ornithodorus; Octobius, Cheyletidae, for example, Cheyletus, Psorergates, Demodicidae, Trombiculidae, for example, Trombicula, Eurombicula, Schöngastia, Acomatacurus, Neochöngastia, Euschöngastia, Sarcoptiformes, for example, Notoedres, Scarcoptes, Knemidokoptes, Psoroptidae, for example, Psoroptes, Chloriptes, Otodectes, or Tetranychidae, for example, *Tetranychus telarius* or *Tetranychus urticae.*

The phosphoric acid esters of Formula I are also active against phytopathogenic nematodes, such as Aphelenchoides, for example *A. ritzemabosi, A. fragariae,* and *A. oryzae,* varieties of Ditylenchus such as *D. Dipsaci,* varieties of Meloidogyne such as *M. arenaria* and *M. incognita* and varieties of Heterodera such as *H. rostochiensis* and *H. schachtii,* and also varieties such as Paratylenchus, Rotylenchus, Xiphinema and Radopholus.

A fungitoxic and bacteriostatic action has also been observed, for the compounds of the present invention.

Good to very good fungicidal action has been found on the following species: *Alternaria tenuis, Botrytis cinerea, Clasterosporium c.; Coniothrium dipl., Fusarium culm., Mucor spec., Penicilium spec., Stemphylium cons., Botrytis fabae.*

The present invention therefore also provides biocidal preparations, especially insecticidal and acaricidal preparations, which comprise, as active ingredient, at least one phosphoric acid ester of the general Formula I, and, if desired, one or more appropriate carriers, for example, solvents, dispersing agents, wetting agents, adhesives, thickeners and, under certain circumstances, further pesticides.

If the pure active substances are applied as a smoke, spray, mist or the like, their biocidal action manifests itself within an extremely short time in the case of, for example, midges, whilst in the case of other insects, somewhat longer times (up to about 1 hour) are found necessary until the action manifests itself.

The ovicidal activity of the compounds of Formula I was investigated on the eggs of meal moths, cotton bugs, polyvalent-resistant and normally sensitive houseflies, gnats and Colorado beetles. Freshly laid eggs were brought into contact with the active substance in the form of an emulsion. The active substances to be used according to the invention show a good ovicidal activity up to high dilutions, that is to say to about 0.01% relative to the active substance.

The acaricidal activity of the compound of Formula I was tested on mites. A good action was found on tarsal contact.

The agents which contain the active substances of Formula I can be applied in the most diverse manner, mainly in the form of aqueous sprays, dusting powders or granules.

Aqueous sprays can for example be produced on the basis of an emulsifiable concentrate or a wettable powder. A suitable emulsifiable concentrate can, for example, be manufactured from about 25 parts of a compound of Formula I, 40–50 parts of diacetone-alcohol or isophorone, 20–30 parts of an aromatic petroleum product, xylene, toluene or some other mixture of such solvents, and 2–10 parts of one or more emulsifying agents. It is also possible to use small amounts of an agent which assists the formation of a homogeneous solution, such as methanol, methoxymethanol or butoxymethanol.

A suitable emulsifier can for example be manufactured from 1–1.5 parts of calcium or sodium dodecylbenzenesulphonate, 2.5–4 parts of an octyl- or nonyl-phenoxy-polyethoxy-ethanol, as well as about 0.5–1 part of methanol and 0–0.8 part of xylene. The resulting mixture is added to the solvents and to the active substance of Formula I in the quantity ratio indicated above. It is however also possible to use one or more other surface-active agents.

Depending on its appropriateness, an anionic, cationic or non-ionic emulsifier soluble in solvents can be used. Instead of the abovementioned non-ionic agent derived from an alkylphenol and ethylene oxide, it is also possible to employ ethylene oxide condensates of long-chain alcohols, carboxylic acids, phenols or amines. Non-ionic concentrates of polyglycerines and fatty acids or of polyglycerines and a resin-forming acid such as phthalic acid can also be used in the manufacture of self-emulsifying preparations. Typical anionic agents are those based on alcohol sulphonates, alcohol sulphates or alcohol sulphosuccinates. Cationic surface-active substances soluble in solvents are, for example, oleyl-benzyldimethylammonium chloride, or dodecyl-benzyl-trimethylammonium chloride or bromide. From this it may be seen that the character of the emulsifier is in detail of no special significance, provided that it is soluble in the solution of the active substance in one or in several inert solvents.

A wettable powder can be obtained if an active substance of Formula I is taken up in a volatile solvent such as for example acetone, brought together with a finely divided solid such as kaolin, pyrophyllite or diatomaceous earth, and the solvent evaporated. The powder is heated with small amounts of one or more wetting agents or dispersing agents. A typical composition for example consists of 20 parts of an active substance of Formula I, 77.5 parts of one or more finely divided solids, 0.5 part of wetting agent, such as an octylphenoxy-polyethoxy-ethanol and 2 parts of the sodium salt of methylene-bis-naphthalene-disulphonic acid.

Dusts containing 5–10% of the active agent can be manufactured by diluting such a wettable powder with a finely divided solid carrier. Wetting agents or dispersing agents can optionally be added.

Granules, such as are, say, used for combatting soil pests, are for example obtainable by dissolving an active substance of Formula I in an organic solvent, applying the solution thus obtained to a granular mineral, for example attapulgite, $SiO_2$, granicalcium, bentonite and the like, and then again evaporating the organic solvent.

It is also possible to use polymer granules. They can be manufactured by mixing the active substances of Formula I with polymerizable compounds (urea/formaldehyde, dicyandiamide/formaldehyde, melamine/formaldehyde or others), after which a mild polymerization is carried out which leaves the active substances unaffected, with the granulation being carried out whilst the gel formation is still proceeding. A more advantageous method is to impregnate finished, porous polymer granules (urea/formaldehyde, polyacrylonitrile, polyesters or others) having a certain surface area and an advantageous pre-determinable adsorption/desorption ratio with the active substances, for example in the form of their solutions (in a low-boiling solvent) and to remove the solvent.

Such polymer granules, in the form of microgranules with bulk densities of, preferably, 300 g./liter to 600 g./liter, can also be applied by means of sprays. The spraying can be carried out over crops covering a large area with the aid of aircraft.

Of course further pesticides, fertilizers, surface-active agents or substances for increasing the specific gravity, such as $BaSO_4$, can be added to the granules.

Granules are also obtainable by compacting the carrier material with the active substances and additives and subsequent comminution.

In general, the pesticides according to the invention contain between 0.1 and 20 percent by weight of active substance of Formula I in the case of more dilute agents, and between 20 and 98 percent by weight where concentrated agents are intended.

The action of the dithiophosphates according to the invention can be further increased by synergistic agents. Suitable materials for this purpose are, for example, Sesamine, Sesamex, piperonyl-cyclonene, piperonyl-butoxide, piperonal - bis[2 - (2-butoxyethoxy)ethyl]acetate, sulphoxide, propylisome, N-(2-ethylhexyl)-5-norbornene-2,3-dicarboxamide, octachlorodipropyl-ether, 2-nitrophenyl-propargyl-ether, 4-chloro-2-nitrophenyl-propargyl-ether and 2,4,5-trichlorophenyl-propargyl-ether.

The compounds of Formula I can be combined with further insecticidal, acaricidal and/or nematocidal active substances for broadening the use spectrum. A series of examples are given below.

PHOSPHORIC ACID DERIVATIVES bis-o,o-diethylphosphoric acid anhydride (TEPP)
O,O,O,O-tetrapropyldithiopyrophosphate
dimethyl(2,2,2-trichloro-1-hydroxyethyl)phosphonate (Trichrorfon)
1,2-dibromo-2,2-dichloroethyldimethylphosphate (naled)
2,2-dichlorovinyldimethylphosphate (Dichlorfos)
2-methoxycarbamyl-1-methylvinyldimethylphosphate (mevinphos)
dimethyl-1-methyl-2-(methylcarbamoyl)vinylphosphate cis (Monocrotophos)
3-(dimethoxyphosphinyloxy)-N-methyl-N-methoxy-cis-crotonamide
3-(dimethoxyphosphinyloxy)-N,N-dimethyl-cis-crotonamide (Dicrotophos)
2-chloro-2-diethylcarbamoyl-1-methylvinyldimethylphosphate (Phosphamidon)
O,O-diethyl-O(or S)-2-(ethylthio)-ethylthiophosphate (Demeton)
S-ethylthioethyl-O,O-dimethyl-dithiophosphate (Thiometon)
O,O-diethyl-S-ethylmercaptomethyldithiophosphate (Phorate)
O,O-diethyl-S-2-[(ethylthio)ethyl]dithiophosphate (Disulfoton)
O,O-dimethyl-S-2-(ethylsulphinyl)ethylthiophosphate (Oxydemetonmethyl)
O,O-dimethyl-S-(1,2-dicarbethoxyethyl)dithiophosphate (Malathion)
(O,O,O,O-tetraethyl-S,S'-methylene-bis-[dithiophosphate] (Ethion)
O-ethyl-S,S-dipropyldithiophosphate
O,O-dimethyl-S-(N-methyl-N-formylcarbamoylmethyl)-dithiophosphate (Formotion)
O,O-dimethyl-S-(N-methylcarbamoylmethyl)dithiophosphate (Dimethat)
O,O-dimethyl-S-(N-ethylcarbamoylmethyl)dithiophosphate (Ethoatmethyl)
O,O-diethyl-S-(N-isopropylcarbamoylmethyl)-dithiophosphate (Prothoat)
S-N-(1-cyano-1-methylethyl)carbamoylmethyldiethylthiolphosphate (Cyanthoat)
S-(2-acetamidoethyl)-O,O-dimethyldithiophosphate
Hexamethylphosphoric acid triamide (Hempa)
O,O-dimethyl-O-p-nitrophenylthiophoshate (Parathion-methyl)
O,O-diethyl-O-p-nitrophenylthiophosphate (Parathion)
O-ethyl-O-p-nitrophenylthiophosphonate (EPN)
O,O-dimethyl-O-(4-nitro-m-tolyl)thiophosphate (Fenitrothion)
O,O-dimethyl-O-(2-chloro-4-nitrophenyl)thiophosphate (dicapthon)
O,O-dimethyl-O-p-cyanophenylthiophosphate (Cyanox)
O-ethyl-O-p-cyanophenylphenylthiophosphonate
O,O-diethyl-O-2,4-dichlorophenylthiophosphate (Dichrofenthion)
O-2,4-dichlorophenyl-O-methylisopropylamidothiophosphate O,O-dimethyl-O-2,4,5-trichlorophenylthiophosphate (Ronnel)
O-ethyl-O-2,4,5-trichlorophenylethylthiophosphonate (Trichloronat)
O,O-dimethyl-O-2,5-dichloro-4-bromophenylthiophosphate (Bromophos)
O,O-diethyl-O-2,5-dichloro-4-bromophenylthiophosphate (Bromophos-ethyl)
O,O-dimethyl-O-(2,5-dichlor-4-iodophenyl)-thiophosphate (Iodofenphos)
4-tert. butyl-2-chlorophenyl-N-methyl-O-methylamidophosphate (Crufomat)
Dimethyl-p-(methylthio)phenylphosphate
O,O-dimethyl-O-(3-methyl-4-methylmercaptophenyl) thiophosphate (Fenthion)
Isopropylamino-O-ethyl-O-(4-methylmercapto-3-methylphenyl)-phosphate
O,O-diethyl-O-p-[(methylsulphinyl)phenyl]-thiophosphate (Fensulfothion)
O,O-dimethyl-O-p-sulphamido-phenylthiophosphate
O-[p-(dimethylsulphamido)phenyl]O,O-dimethylthiophosphate (Famphur)
O,O,O',O'-tetramethyl-O,O'-thiodi-p-phenylenethiophosphate
O-(p-(p-chlorophenylazophenyl)O,O-dimethylthiophosphate (Azothoat)
O-ethyl-S-phenyl-ethyldithiophosphonate
O-ethyl-S-4-chlorophenyl-ethylidithiophosphonate
O-isobutyl-S-p-chlorophenyl-ethyldithiophosphonate
O,O-dimethyl-S-p-chlorophenylthiophosphonate
O,O-dimethyl-S-(p-chlorophenylthiomethyl)-dithiophosphate
O,O-diethyl-p-chlorophenylmercaptomethyl-dithiophosphate (Carbophenothion)
O,O-diethyl-S-p-chlorophenylthiomethyl-thiophosphate
O,O-dimethyl-S-(carbethoxy-phenylmethyl)dithiophosphate (Phenothoat)
O,O-diethyl-S-(carbofluorethoxy-phenylmethyl)-dithiophosphate
O,O-dimethyl-S-(carbisopropoxy-phenylmethyl)-dithiophosphate
O,O-dimethyl-O-(alpha-methylbenzyl-3-hydroxycrotonyl)phosphate,
2-chloro-1-(2,4-dichlorophenyl)vinyl-diethylphosphate (Chlorfenvinphos)
2-chloro-1-(2,4,5-trichlorophenyl)vinyl-dimethylphosphate
O-(2-chloro-1-(2,5-dichlorophenyl)vinyl-O,O-diethylthiophosphate
phenylglyoxylonitriloxime-O,O-diethylthiophosphate (Phoxim)
O,O-diethyl-O-(3-chloro-4-methyl-2-oxo-2-H-1-benzopyran-7-yl)-thiophosphate (Coumaphos)
O,O-diethyl-7-hydroxy-3,4-tetramethylene-coumarinyl-thiophosphate (Coumithoat)
2,3-p-dioxanedithiol-S,S-bis(O,O-diethyldithiophosphate) (Dioxathion)
2-methoxy-4-H-1,3,2-benzodioxaphosphorine-2-sulphide
O,O-diethyl-O-(5-phenyl-3-isooxyzolyl (sic)) thiophosphate
S-[(6-chlor-2-oxo-3-benzoxazolinyl)methyl]O,O-diethyldithiophosphate (Phosalon)
2-(diethoxyphosphinylimino)-4-methyl-2,3-dithiolane
O,O-dimethyl-S-[2-methoxy-1,3,4-thiadiazol-5-(4H)-onyl-(4)-methyl]dithiophosphate
tris-(2-methyl-1-aziridinyl)-phosphine-oxide (Metepa)
O,O-dimethyl-S-phthalimidomethyl-dithiophosphate
S-(2-chloro-1-phthalimidoethyl)-O,O-diethyldithiophosphate
N-hydroxynaphthalimido-diethylphosphate
dimethyl-3,5,6-trichloro-2-pyridylphosphate
O,O-dimethyl-O-(3,5,6-trichloro-2-pyridyl)thiophosphate
O,O-diethyl-O-(3,5,6-trichloro-2-pyridyl)thiophosphate
O,O-diethyl-O-2-pyrazinylthiophosphate (Thionazin)
O,O-diethyl-O-(2-isopropyl-4-methyl-6-pyrimidyl)thiophosphate (Diazinon)
O,O-diethyl-O-(2-quinoxylyl)thiophosphate
O,O-dimethyl-S-(4-oxo-1,2,3-benzotriazin-3(4H)-yl-methyl)-dithiophosphate (Azinphosmethyl)
O,O-diethyl-S-(4-oxo-1,2,3-benzotriazin-3(4H)-yl-methyl)-dithiophosphate (Azinphosethyl)
S-[(4,6-diamino-s-triazin-2-yl)methyl]-O,O-dimethyl-dithiophosphate (Menazon)
S-[2-(ethylsulphonyl)ethyl]dimethylthiophosphate (Dioxydemeton-S-methyl)
Diethyl-S-[2-(ethylsulphinyl)ethyl]dithiophosphate (Oxydisulfoton)
bis-O,O-diethylthiophosphoric acid anhydride (sulfotep)
dimethyl-1,3-di(carbomethoxy)-1-propen-2-yl-phosphate
dimethyl-(2,2,2-trichloro-1-butyroyloxyethyl)phosphonate (Butonat)
O,O-dimethyl-O-(2,2-dichloro-1-methoxy-vinyl)phosphate
O,O-dimethyl-O-(3-chloro-4-nitrophenyl)thiophosphate (Chlorthion)
O,O-dimethyl-O(or S)-2-(ethylthioethyl)thiophosphate (Demeton-S-methyl)
bis-(dimethylamido)fluorophosphate (Dimefox)
2-(O,O-dimethyl-phosphoryl-thiomethyl)-5-methoxypyrone-4
3,4-dichlorobenzyl-triphenylphosphonium chloride
dimethyl-N-methoxymethylcarbamoylmethyl-dithiophosphate (Formocarb)
O,O-diethyl-O-(2,2-dichloro-1-chlorethoxyvinyl)phosphate
O,O-dimethyl-O-(2,2-dichloro-1-chlorethoxyvinyl)phosphate
O-ethyl-S,S-diphenyldithiolphosphate
O-ethyl-S-benzyl-phenyldithiophosphonate
O,O-diethyl-S-benzyl-thiolphosphate
O,O-dimethyl-S-(4-chlorophenylthiomethyl)dithiophosphate (Methylcarbophenothion)
O,O-dimethyl-S-(ethylthiomethyl)dithiophosphate
diisopropylaminofluorophosphate (Mipafox)
O,O-dimethyl-S-(morpholinylcarbamoylmethyl)dithiophosphate (Morphothion)
bismethylamido-phenylphosphate
O,O-dimethyl-S-(benzenesulphonyl)dithiophosphate
O,O-dimethyl-(S and O)-ethylsulphinylethylthiophosphate
O,O-diethyl-O-4-nitrophenylphosphate
O,O-diethyl-S-(2,5-dichlorophenylthiomethyl)dithiophosphate (Phendapton)
triethoxy-isopropoxy-bis(thiophosphinyl)disulphide
O,O-diethyl-O-(4-methyl-coumarinyl-7)-thiophosphate (Potasan)
2-methoxy-4H-1,3,2-benzodioxaphosphorine-2-oxide
octamethylpyrophosphoramide (Schradan)
bis(dimethoxythiophosphinylsulphido)-phenylmethane
5-amino-bis(dimethylamido)phosphinyl-3-phenyl-1,2,4-triazole (Triamiphos)
N-methyl-5-(O,O-dimethylthiolphosphoryl)-3-thiavaleramide (Vamidothion) and
N,N,N',N'-tetramethyldiamidofluorophosphate (Dimefox)

CARBAMIC ACID DERIVATIVES 1-naphthyl-N-methylcarbamate (Carbaryl)
2-butinyl-4-chlorophenylcarbamate
4-dimethylamino-3,5-xylyl-N-methylcarbamate
4-dimethylamino-3-tolyl-N-methylcarbamate (Aminocarb)
4-methylthio-3,5-xylyl-N-methylcarbamate (Methiocarb)
3,4,5-trimethylphenyl-N-methylcarbamate
2-chlorophenyl-N-methylcarbamate (CPMC)
5-chlor-6-oxo-2-norbornane-carbonitrile-O-(methylcarbamoyl)-oxime 1-(dimethylcarbamoyl)-5-methyl-3-pyrazolyl-N,N-
  dimethylcarbamate (Dimetilan)
2,3-dihydro-2,2-dimethyl-7-benzofuranyl-N-methyl-
  carbamate (Carbofuran)
2-methyl-2-methylthio-propionaldehyde-O-(methyl-
  carbamoyl)-oxime (Aldicarb)
8-quinaldyl-N-methylcarbamate and its salts
methyl 2-isopropyl-4-(methylcarbamoyloxy)carbanilate
m-(1-ethylpropyl)phenyl-N-methylcarbamate
3,5-di-tert.butyl-N-methylcarbamate
m-(1-methylbutyl)phenyl-N-methylcarbamate
2-isopropylphenyl-N-methylcarbamate
2-sec. butylphenyl-N-methylcarbamate
m-tolyl-N-methylcarbamate
2,3-xylyl-N-methylcarbamate
3-isopropylphenyl-N-methylcarbamate
3-tert. butylphenyl-N-methylcarbamate
3-sec.-butylphenyl-N-methylcarbamate
3-isopropyl-5-methylphenyl-N-methylcarbamate
  (Promecarb)
3,5-diisopropylphenyl-N-methylcarbamate
2-chlor-5-isopropylphenyl-N-methylcarbamate
2-chlor-4,5-dimethylphenyl-N-methylcarbate
2-(1,3-dioxolan-2-yl)phenyl-N-methylcarbamate
  (Dioxycarb)
2-(4,5-dimethyl-1,3-dioxolan-2-yl)phenyl-N-methyl-
  carbamate
2-(1,3-dioxan-2-yl)phenyl-N-methylcarbamate
2-(1,3-dithiolan-2-yl)phenyl-N-methylcarbamate
2-(1,3-dithiolan-2-yl)phenyl-N,N-dimethylcarbamate
2-isopropoxyphenyl-N-methylcarbamate
  (Arprocarb)
2-(2-propinyloxy)phenyl-N-methylcarbamate
2-(2-propinyloxy)phenyl-N-methylcarbamate
3-(2-propinyloxy)phenyl-N-methylcarbamate
2-dimethylaminophenyl-N-methylcarbamate
2-diallylaminophenyl-N-methylcarbamate
4-diallylamino-3,5-xylyl-N-methylcarbamate
  (Allyxicarb)
4-benzothienyl-N-methylcarbamate
2,3-dihydro-2-methyl-7-benzofuranyl-N-methyl-
  carbamate
3-methyl-1-phenylpyrazol-5-yl-N,N-dimethylcarbamate
1-isopropyl-3-methylpyrazol-5-yl-N,N-dimethyl-
  carbamate (Isolan)
2-(N',N'-dimethylcarbamoyl)-3-methylpyrazol-5-yl-
  N,N-dimethylcarbamate
2-dimethylamino-5,6-dimethylpyrimidin-4-yl-N,N-
  dimethylcarbamate
3-methyl-4-dimethylaminomethyleneiminophenyl-N-
  methylcarbamate
3-dimethylamino-methyleneiminophenyl-N-methyl-
  carbamate
1-methylthio-ethylimino-N-methylcarbamate
  (Methoxymyl)
2-methylcarbamoyloxyimino-1,3-dithiolane
5-methyl-2-methylcarbamoyloxyimino-1,3-oxathiolane
2-(1-methoxy-2-propoxy)phenyl-N-methylcarbamate
2-(1-butin-3-yl-oxy)phenyl-N-methylcarbamate
3-methyl-4-(dimethylamino-methylmercapto-methylene-
  imino)phenyl-N-methylcarbamate
1,3-bis(carbamoylthio)-2-(N,N-dimethylamino)-
  propane hydrochloride
5,5-dimethylhydroresorcinoldimethylcarbamate
2-[propargylethylamino]-phenyl-N-methylcarbamate
2-[propargylmethylamino]-phenyl-N-methylcarbamate
2-[dipropargylamino]-phenyl-N-methylcarbamate
3-methyl-4-[dipropargylamino]-phenyl-N-methyl-
  carbamate
3,5-dimethyl-4-[dipropargylamino]-phenyl-N-methyl-
  carbamate
2-[allyl-isopropylamino]-phenyl-N-methylcarbamate
  and
3-[allyl-isopropylamino]-phenyl-N-methylcarbamate.

CHLORINATED HYDROCARBONS

γ-hexachlorocyclohexane [Gammexane; Lindane;
  γ HCH]
1,2,4,5,6,7,8,8-octachloro-3α,4,7,7α'-tetrahydro-4,7-
  methyleneindane [Chlordan]
1,4,5,6,7,8,8-heptachloro-3α,4,7,7α-tetrahydro-4,7-
  methyleneindane [Heptachlor]
1,2,3,4,10,10-hexachloro-1,4,4α,5,8,8α-hexahydro-
  endo-1,4-exo-5,8-dimethanonaphthalene [Aldrin]
1,2,3,4,10,10-hexachlor-6,7-epoxy-1,4,4α,5,6,7,8,8α,9-
  octahydro-exo-1,4-endo-5,8-dimethanonaphthalene
  [Dieldrin] ditto, endo-endo- [Endrin]
6,7,8,9,10,10-hexachloro-1,5,5α,6,9,9α-hexahydro-6,9-
  methano-2,3,4-benzo[e]-dioxa-thiepene-3-oxide
  [Endosulfan]
Chlorinated camphor [Toxaphen]
Decachloroctahydro-1,3,4-metheno-2H-cyclobuta
  [ed]pentalen-2-one
Dodecachloroctahydro-1,3,4-metheno-1H-cyclobuta
  [cd]pentalene [Mirex]
Ethyl-1,1α,3,3α,4,5,5α,5α,6-decachloroctahydro-2-hy-
  droxy-1,3,4-metheno-1H-cyclobuta[cd]penta-
  lene-2-laevulinate
Bis(pentachloro-2,4-cyclopentadien-1-yl)
Dinoctone-o
1,1-trichloro-2,2-bis(p-chlorophenyl)ether [DDT]
Dichlorodiphenyl-dichlorethane [TDE]
Di(p-chlorophenyl)-trichloromethylcarbinol [Dicofol]
Ethyl-4,4'-dichlorophenylglycollate [Chlorobenzylate]
Ethyl-4,4'-dibromobenzylate [Bromobenzylate]
Isopropyl-4,4'-dichlorobenzylate
1,1,1-trichloro-2,2 bis(p-methoxyphenyl)ethane
  [Methoxychlor]
Diethyl-diphenyl-dichlorethane
Decachloropentacyclo(3,3,2,0$^{2,6}$,0$^{3,9}$,0$^{7,10}$)decan-4-one
  [Chlordecon].

NITROPHENOLS AND DERIVATIVES 4,6-dinitro-6-methylphenol Na salt [dinitrocresol]
Dinitrobutylphenol-2,2',2''-triethanolamine salt
2-cyclohexyl-4,6-dinitrophenol [Dinex]
2-(1-methylheptyl)-4,6-dinitrophenyl-crotonate
  [Dinocap]
2 sec.-butyl-4,6-dinitrophenyl-3-methyl-butenoate
  [Binapacryl]
2 sec.-butyl-4,6-dinitrophenyl-cyclopropionate and
2 sec.-butyl-4,6-dinitrophenyl-isopropyl-carbonate
  [Dinobuton]

VARIOUS SUBSTANCES

Sabadilla                  Veratridin
Rotenon                    Ryania
Cevadin                    Pyrethrin
3-allyl-2-methyl-4-oxo-2-cyclopenten-1-yl-chrysan-
  themumate (Allethrin)
6-chloropiperonyl-chrysanthemumate (Barthrin)
2,4-dimethylbenzylchrysanthemumate (Dimethrin)
2,3,4,5-tetrahydrophthalimidomethyl-chrysanthemumate
(5-benzyl-3-furyl)-methyl-2,2-dimethyl-3-(2-methyl-
  propanyl)cyclopropanecarboxylate
Nicotine
*Bacillus thuringiensis* Berliner
Dicyclohexylcarbodiimide
Diphenyldiimide [azobenzene]
4-chlorobenzyl-4-chlorophenylsulphide [Chlorbensid]
Creosote oil
6-methyl-2-oxo-1,3-dithiolo-[4,5-b]-quinoxaline
  [Quinomethionate]
(I)-3-(2-furfuryl)-2-methyl-4-oxocyclopent-2-enyl(I)-
  (cis+trans)chrysanthemum-monocarboxylate
  [Furethrin]
2-pivaloyl-indane-1,3-dione [Pindon]
2-fluorethyl(4-bisphenyl)acetate
2-fluoro-N-methyl-N(1-naphthyl)-acetamide Pentachlorophenol and salts
2,2,2-trichloro-N-(pentachlorophenyl)-acetimidoyl chloride
N'-(4-chloro-2-methylphenyl)-N,N-dimethylformamidine (Chlorphenamidine)
4-chlorobenzyl-4-fluorophenyl-sulphide (Fluorobenside)
5,6-dichloro-1-phenoxycarbanyl-2-trifluoromethyl-benzimidazole (Fenozaflor)
Tricyclohexyl-tin hydroxide
2-thiocyanatoethyl-lauric acid ester
β-butoxy-β'-thiocyanatodiethyl-ether
Isobornyl-thiocyanatoacetate
p-chlorophenyl-p-chlorobenzenesulphonate (Ovex)
2,4-dichlorophenyl-benzenesulphonate
p-chlorophenyl-benzensulphonate (Fenson)
p-chlorophenyl-2,4,5-trichlorophenylsulphone (Tetradifon)
p-chlorophenyl-2,4,5-trichlorophenylsulphide (Tetrasul)
Methyl bromide
p-chlorophenyl-phenylsulphone
p-chlorobenzyl-p-chlorophenylsulphide (Chlorobenside)
4-chlorophenyl-2,4,5-trichlorophenylazosulphide
2(p-tert.-butylphenoxy-1-methylethyl-2-chlorethyl-sulphite
2(p-tert.-butylphenoxy)cyclohexyl-2-propinyl-sulphite
4,4'-dichloro-N-methylbenzenesulphonanilide
N-(2-fluoro-1,1,2,2-tetrachlorethylthio)-methanesulphonanilide
2-thio-1,3-dithiol-(4,5,6)quinoxaline (Thioquinox)
chloromethyl-p-chlorophenylsulphone (lauseto new)
1,3,6,8-tetranitrocarbazole, and
prop-2-ynyl-(4-t-butylphenoxy)-cyclohexylsulphite (Propargil).

The compounds of Formula I can be manufactured in

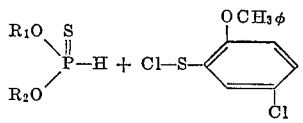

or from 2 - methoxy - 5 - chlorophenyl-chloro-dithio-phosphate by replacing the two chlorine atoms present on the P-atom by the substituents $R_1O-$ or $R_2O-$ by reaction with the appropriate alcoholate Met $OR_1$ or successively with the alcoholates Met $OR_1$ and Met $OR_2$ in the presence of an acid acceptor. "Met" is here intended to denote an alkali metal such as Na or K.

The compounds of the present invention are, however, preferably prepared by the following process.

The present invention also provides a process for the manufacture of the new phosphoric acid esters of Formula I, wherein a salt of a dithiophosphoric acid ester of the formula

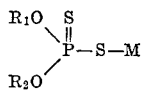

in which $R_1$ and $R_2$, which may be the same or different, each represents a straight chain or branched alkyl radical having from 1 to 4 carbon atoms and M represents a metal atom, preferably an alkali metal atom, for example Na or K, is treated with diazotized 2-methoxy-5-chloraniline in a two-phase system at a temperature of from 10° to 100° C., preferably from 20° to 70° C.

The reaction is catalyzed by copper. By a two-phase system there is herein meant an aqueous solution together with a further layer of an organic solvent, which is immiscible with water. Possible solvents of this nature are ether, chloroform, methylene chloride, ethylene chloride, petroleum ether, benzene, toluene, xylene, chlorobenzene, dichlorobenzene, nitrobenzene and others.

This reaction is generally applicable to the manufacture of O,O-dialkyl-S-aryl-dithiophosphoric acid esters.

The present invention therefore provides a general process for the manufacture of compounds of the formula

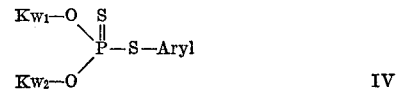

in which $Kw_1$ and $Kw_2$ each represent a hydrocarbon radical and Aryl represents an unsubstituted or substituted aryl radical, wherein a salt of a dithiophosphoric acid ester of the formula

in which M represents a metal atom, preferably an alkali metal atom, for example, Na or K, is treated with a diazotized aromatic amine, which may be substituted in any desired manner, in a two-phase system of water and a water-insoluble organic component, at a temperature of from 10° to 100° C., preferably from 20° to 70° C., and preferably in the presence of copper as a catalyst.

Possible organic water-insoluble components are ether, chloroform, methylene chloride, ethylene chloride, petroleum ether, benzene, toluene, xylene, chlorobenzene, dichlorobenzene, nitrobenzene and others.

The process of the present invention is especially suitable for the manufacture of compounds of the Formula V

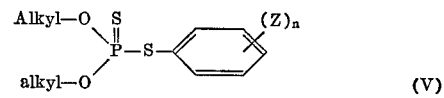

in which Alkyl and alkyl each represents a lower alkyl group having at most 4 carbon atoms, n is a number from 0 to 5 and Z denotes a number, determined by n, of identical or different substituents from the following group: halogen, aliphat, substituted amino groups, ether, carboxylic acid, carbonamide, hydroxyl, sulphonic acid and optionally substituted sulphonamide.

Here aliphat is understood to mean hydrocarbon chains with one or more chain members containing C, which are optionally interrupted by hetero atoms, for example, O, N or S, substituted by a phenyl ring or by halogen atoms, or bonded to the phenyl nucleus of Formula V via O, N or S.

Preferably, those compounds of Formula V are manufactured in which n represents a number from 0 to 3, with two substituents Z occupying the 2,3-, 3,4-, 3,5-, 2,4-, 2,5- or 2,6-position and three substituents preferably occupying the 2,4,5-, the 2,4,6- or the 3,4,5-position.

The following examples illustrate the invention, the parts being by weight.

EXAMPLE 1

31.5 parts of 4-chloro-2-anisidine in 200 parts by volume of water are converted into the hydrochloride with 60 parts by volume of concentrated hydrochloric acid and diazotized in the customary manner with 14 parts of sodium nitrite in 60 parts by volume of water. Thereafter nitrogen is still passed through the solution for 1 hour at 0-2° C. in order to remove nitrous gases which may be present. 50 parts by volume of chlorobenzene and a solution of 44.8 parts of the potassium salt of diethyl-dithiophosphoric acid and 10.6 parts of sodium carbonate in 100 parts by volume of water are then successively added, followed finally by 0.2 part of copper powder, and the mixture is warmed to 40-50° C. for 2 hours. After cooling, the aqueous phase is separated off and the organic solution is twice extracted with 50 parts by volume of 1 N sodium hydroxide solution at a time. After drying over sodium sulphate and evaporating off the solvent in vacuo at 40–50° C. bath temperature, 63 parts of the phosphoric acid ester of the following formula

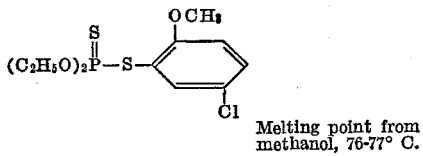

Melting point from methanol, 76–77° C.

are obtained.

(Active substance No. 1) $LD_{50}$ p.o. 370 mg. of active substance/kg. of body weight (rat).

The dimethyl ester of formula

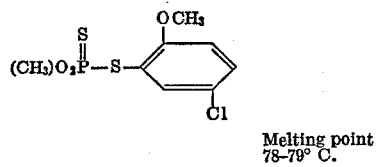

Melting point 78–79° C.

can be obtained analogously.

(Active substance No. 2) $LD_{50}$ p.o. >6000 mg. of active substance/kg. of body weight (rat).

The following compounds can be manufactured analogously:

| No. 3 | $nC_3H_7O\backslash \\ nC_3H_7O/P(=S)-S-\langle OCH_3, Cl \rangle$ | $n_D^{24}$ 1.5582 |
|---|---|---|
| No. 4 | $CH_3O\backslash \\ C_2H_5O/P(=S)-S-\langle OCH_3, Cl \rangle$ | $n_D^{24}$ 1.5853 |
| No. 5 | $CH_3O\backslash \\ \text{iso-}C_3H_7O/P(=S)-S-\langle OCH_3, Cl \rangle$ | $n_D^{24}$ 1.5798 |

FORMULATION EXAMPLES 2 TO 5

(2) Dusting agents

Equal parts of an active substance and of precipitated silica are finely ground. Dusting agents preferably containing 1–6% of active substance can be manufactured therefrom by mixing with kaolin or talc.

(3) Spraying powders

In order to manufacture a spraying powder which is soluble in water, the following components are mixed and finely ground:

50 parts of active substance according to the present invention
20 parts of Hisil (highly adsorbent silica)
25 parts of bolus alba (kaolin)
1.5 parts of sodium 1-benzyl-2-stearyl-benzimidazole-6,3'-disulphonate, and
3.5 parts of a reaction product of p-tert. octylphenol and ethylene oxide.

(4) Emusion concentrates (a) 40 parts of an active substance of Formula I are mixed with 10 parts of a mixture of an anionic surface-active compound, preferably the calcium or magnesium salt of monolauryl-benzene-monosulphonic acid and of a non-ionic surface-active compound, preferably a polyethylene glycol ether of monosorbitol-laurate, and the whole is dissolved in a little xylene. The mixture is made up to 100 cc. with xylene and a clear solution is thus obtained, which can be used as a spraying agent concentrate and which gives a stable emulsion by pouring into water.

(b) Easily soluble active substances can also be formulated as an emulsion concentrate in accordance with the following instruction:

20 parts of active substance, 70 parts of xylene and 10 parts of a mixture of a reaction product of an alkylphenol with ethylene oxide and calcium dodecylbenzenesulphonate are mixed. On dilution with water to the desired concentration, a sprayable emulsion is produced.

(5) Granules (A) 7.5 g. of one of the active substances of Formula I are dissolved in 100 ml. of acetone and the acetone solution thus obtained is added to 92 g. of granular attapulgite (mesh width: 24/48 meshes/inch). The whole is well mixed and the solvent is stripped off in a rotary evaporator. Granules containing 7.5% of active substance are obtained.

(B) In order to manufacture 10% strength polymer granules, 1050 to 1100 g. of technical quality active substance of Formula I are dissolved in 2 liters of trichlorethylene and sprayed in a fluidized bed granulator, under 1.5 atmospheres gauge spraying pressure, onto 9230 g. of initially introduced porous urea/HCHO granules. The solvent can again be removed by heating the fluidizing air to about 50° C.

(C) In order to manufacture 7.5% strength weighted granules, 770 g. of a solid industrial quality active substance of Formula I, 500 g. of $BaSO_4$, 1000 g. of urea and 7730 g. of powdery porous polyacrylonitrile are pressed together on a roll mill and subsequently broken up to the desired particle size.

BIOLOGICAL EXAMPLES 6+7

(6) Action against acarina (A) 5 adult hungry ticks (*Rhipicephalus bursa*) were counted out into a glass test tube and dipped for 1 minute into 2 ml. of an aqueous solution of Compound No. 1. The test tube was closed with a standard cottonwool pad and then inverted in order to allow the solution of the active substance to be taken up by the cottonwool. The evaluation took place after 2 weeks. Complete destruction was achieved with 0.01% of active substance.

(B) Fully gorged females of the variety *Boophilus microplus* were treated in accordance with the experimental method described under (A). The evaluation took place after 4 weeks. Complete destruction was achieved with 0.02% of active substance of Compound No. 1.

(C) Action against spider mites.—Bush bean plants (*Phaseolus vulgaris*) in the two-leaf stage were infected, with spider mites 12 hours before the treatment with the active substance by placing attacked pieces of leaf from a culture on them, so that after the end of this time a population in all stages of development was present on the plant. The plants were then sprayed with the emulsified active substance with the aid of a chromatography atomizer, until a uniform deposit of droplets are produced on the surface of leaf. Evaluation took place after 7 days: the parts of the plant were inspected under a stereo-microscope in order to calculate the destruction percentages.

The table which follows gives the destruction percentages for the normally sensitive variety *Tetranychus urticae* (Koch) and for the OP-resistant variety *Tetranychus telarius*, after treatment with Compound No. 1.

13

(a) Action against *Tetr. urticae*

| Conc. [p.p.m.] | Destruction | | | | |
|---|---|---|---|---|---|
| | After 2 days | | After 7 days | | |
| | Larvae | Adults | Eggs | Larvae | Adults |
| 800 | 100 | 100 | 80 | 100 | 100 |
| 400 | 100 | 100 | 80 | 100 | 100 |
| 200 | 100 | 100 | 60 | 80 | 100 |
| 100 | 100 | 100 | 0 | 0 | 80 |

(b) Action against *Tetr. telarius*

| 800 | 100 | 100 | 80 | 100 | 100 |
|---|---|---|---|---|---|
| 400 | 100 | 100 | 80 | 80 | 100 |
| 200 | 80 | 80 | 60 | 80 | 100 |
| 100 | 60 | 0 | 0 | 0 | 80 |

(7) Action against insects

The action of the experimental preparations on aphids was investigated using *Aphis fabae* on *Vicia faga*. Plants which had been extensively attacked were sprayed from all sides (contact) or only sprayed from above in the direction of the axis of the shoot, so that the experimental animals sitting under the faces of the leaf were not directly struck by the spray jet (penetration). The evaluation took place after 2 days using a hand magnifying glass. If complete destruction had occurred, the plant was again infested and investigated after a further 3 days.

The destruction is given in percent:

| Compound number | Conc. [p.p.m.] | Contact | | Penetration after 2 days |
|---|---|---|---|---|
| | | After 2 days | After 5 days | |
| 1 | 800 | 100 | 80 | 100 |
| | 400 | 100 | 60 | 100 |
| | 200 | 100 | 60 | 60 |
| | 100 | 100 | — | 60 |
| 2 | 800 | 100 | 100 | 100 |
| | 400 | 100 | 60 | 80 |
| | 200 | 100 | — | 60 |
| | 100 | 80 | — | — |

NOTE.— — =Not tested.

(B) The test with *Epilachna varivestis*, the Mexican bean bug, was carried out as follows: 4–5 seedlings of *Phaseolus vulgaris* in the primary leaf stage, grown in a flowerpot, were dipped into emulsions of the experimental preparations and subsequently allowed to dry. The experimental animals, L–4 stages of the bug, were introduced into a conical cellophane bag, which was subsequently fastened over the treated plant by means of a rubber band. The action resulting from the treatment was determined after 5 days.

| Compound No. | Conc. [p.p.m.] | Destruction in percent |
|---|---|---|
| 1 | 800 | 100 |
| | 400 | 100 |
| | 200 | 100 |
| 2 | 800 | 100 |
| | 400 | 80 |
| | 200 | 100 |

14

What is claimed is:

1. An insecticidal composition which comprises (1) as active ingredient an insecticidally effective amount of a compound of the formula

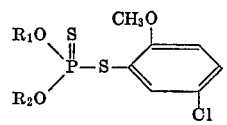

in which each of $R_1$ and $R_2$ represents a straight chain or branched alkyl radical having from 1 to 4 carbon atoms and (2) a carrier.

2. A method for combating insects which comprises applying to an area infested with said insects an insecticidally effective amount of a compound of the formula

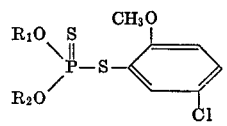

in which each of $R_1$ and $R_2$ represents a straight chain or branched alkyl radical having from 1 to 4 carbon atoms.

3. The method of claim 2 in which the compound is of the formula

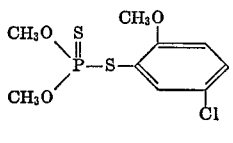

4. The method of claim 2 in which the compound is of the formula

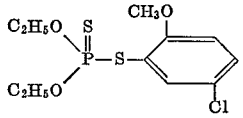

References Cited
UNITED STATES PATENTS

| 3,201,444 | 8/1965 | Schrader | 424—217 |
|---|---|---|---|
| 3,523,999 | 8/1970 | Fearing | 424—217 |

ALBERT T. MEYERS, Primary Examiner

V. D. TURNER, Assistant Examiner

U.S. Cl. X.R.

260—951

UNITED STATES PATENT OFFICE
CERTIFICATE OF CORRECTION

Patent No. 3,781,427　　　　　　　　　Dated December 25, 1973

Inventor(s) Ernst Beriger

It is certified that error appears in the above-identified patent and that said Letters Patent are hereby corrected as shown below:

The following should be inserted in the heading:

Claims priority, application Switzerland

April 28, 1969, No. 6444/69

Signed and sealed this 16th day of July 1974.

(SEAL)
Attest:

McCOY M. GIBSON, JR.　　　　　　　C. MARSHALL DANN
Attesting Officer　　　　　　　　　Commissioner of Patents